United States Patent
Osaheni et al.

(10) Patent No.: US 11,814,478 B2
(45) Date of Patent: Nov. 14, 2023

(54) STABILIZING POLYPROPIOLACTONE BY END-CAPPING WITH END-CAPPING AGENTS

(71) Applicant: Novomer, Inc., Rochester, NY (US)

(72) Inventors: John Osaheni, Rochester, NY (US); Robert E. Lapointe, Rochester, NY (US)

(73) Assignee: Novomer, Inc., Rochester, NY (US)

( * ) Notice: Subject to any disclaimer, the term of this patent is extended or adjusted under 35 U.S.C. 154(b) by 193 days.

(21) Appl. No.: 17/054,808

(22) PCT Filed: Jun. 13, 2019

(86) PCT No.: PCT/US2019/037103
§ 371 (c)(1),
(2) Date: Nov. 12, 2020

(87) PCT Pub. No.: WO2019/241596
PCT Pub. Date: Dec. 19, 2019

(65) Prior Publication Data
US 2021/0221950 A1    Jul. 22, 2021

Related U.S. Application Data

(60) Provisional application No. 62/685,205, filed on Jun. 14, 2018.

(51) Int. Cl.
*C08G 63/91* (2006.01)
*C08G 63/685* (2006.01)
*C08G 63/78* (2006.01)

(52) U.S. Cl.
CPC ....... *C08G 63/912* (2013.01); *C08G 63/6852* (2013.01); *C08G 63/785* (2013.01)

(58) Field of Classification Search
CPC . C08G 63/912; C08G 63/6852; C08G 63/785
See application file for complete search history.

(56) References Cited

U.S. PATENT DOCUMENTS 2,879,295 A * 3/1959 Poehler ................. C07C 29/09
564/462
3,726,830 A    4/1973 Heuser et al.
(Continued)

FOREIGN PATENT DOCUMENTS

CN        1887854 A      1/2007
CN      100519511 C      7/2009
(Continued)

OTHER PUBLICATIONS

Mo, Guang-Zhen et al.: "Synthesis and characterization of a novel drug-loaded polymer, poly(lactic acid-co-aminomethyl benzimidazole)." Designed Monomers and Polmers, 2015, vol. 18, No. 6, pp. 536-544 (9 pages) http://dx.doi.org/10.1080/15685551.2015.1041085.
(Continued)

*Primary Examiner* — Robert S Jones, Jr.
*Assistant Examiner* — Jiangtian Xu
(74) *Attorney, Agent, or Firm* — Young Basile Hanlon & MacFarlane, P.C.

(57) ABSTRACT

Provided herein are methods and systems for producing a thermally stable polylactone polymer comprising chain terminating the polymer with an end-capping agent to prevent scission of the polymer. Also provided is a thermally stable polylactone polymer wherein the polymer has a first end and a second end, wherein at least one of said first and second ends terminate in an end-capping agent.

3 Claims, 4 Drawing Sheets

(56) References Cited

U.S. PATENT DOCUMENTS

| | | |
|---|---|---|
| 3,835,089 A | 9/1974 | Fox |
| 4,066,630 A | 1/1978 | Dixon et al. |
| 4,104,264 A | 8/1978 | Dixon et al. |
| 4,145,525 A | 3/1979 | Dixon et al. |
| 4,303,759 A | 12/1981 | Dixon et al. |
| 4,536,531 A | 8/1985 | Ogawa et al. |
| 4,963,595 A | 10/1990 | Ward et al. |
| 5,525,683 A * | 6/1996 | Adkins ............... C08G 63/91 525/437 |
| 6,844,447 B2 * | 1/2005 | Zhong ............... C07C 51/09 548/543 |
| 9,000,101 B2 | 4/2015 | Myles et al. |
| 10,221,150 B2 | 3/2019 | Farmer et al. |
| 10,221,278 B2 | 3/2019 | Lee et al. |
| 2012/0165479 A1 | 6/2012 | Hong et al. |
| 2018/0016219 A1 | 1/2018 | Farmer et al. |
| 2018/0030201 A1 | 2/2018 | Farmer et al. |
| 2018/0057619 A1 | 3/2018 | Sookraj |
| 2018/0094100 A1 | 4/2018 | Farmer et al. |

FOREIGN PATENT DOCUMENTS

| | | |
|---|---|---|
| EP | 2204397 A2 | 7/2010 |
| JP | 2000143781 A | 5/2000 |
| WO | 2010071212 A1 | 6/2010 |
| WO | 2012008619 A1 | 1/2012 |

OTHER PUBLICATIONS

Supplementary Partial European Search Report issued in co-pending Application No. EP19819545.5 dated Feb. 14, 2022 (9 pages).

Uittenbogaard, Joost P., et al., "Reactions of b-Propiolactone with Nucleobase Analogues, Nucleosides, and Peptides." J Biol Chem. Oct. 21, 2011; 286(42):36198-36214 (5 pages).

International Search Report and Written Opinion for PCT/US2019/37103. dated Oct. 22, 2019. 25 pages.

Yamashita, M. et al., "Processing of Polypropiolactone into Films and Their Properties." Soceity of Polymer Science, Japan in Polymer Preprints Japan—English Edition-; 43, 2; E135, 1994.

Mathisen, T. et al., "Hydrolytic degradation of melt-extruded fibers from poly(b-propiolactone)", J. Appl. Polym. Sci., 39 (3): 591-601 (1990).

Office Action issued in co-pending application JP2020-567230 dated Apr. 19, 2023, with English translation (14 pages).

Zeng, Qingya, "End-capping Star-like Polycaprolactone with Different Functional Groups and the Interaction with Smooth Muscle Cells", a Thesis presented for the Master of Science Degree at the University of Tennessee, Knoxville 2017, 72 pages.

* cited by examiner

STABILIZING POLYPROPIOLACTONE BY END-CAPPING WITH END-CAPPING AGENTS

CROSS-REFERENCE TO RELATED APPLICATIONS

This application is a National Stage Filing under 35 USC 371 of the PCT Application No. PCT/US2019/037103 filed 13 Jun. 2019, published as WO2019/241596, which claims priority from U.S. Provisional Application No. 62/685,205 filed 14 Jun. 2018, both of which are incorporated herein by reference in their entirety for all purposes.

FIELD

The present disclosure relates to more thermally stable lactone based-polyester and processes for producing more thermally stable lactone based polyesters.

BACKGROUND

Generally, a polymer is a larger molecule comprised of multiple repeated smaller molecules called monomers. During polymerization, the monomers are covalently bonded to each other forming larger polymer chains. The composition and arrangement of the monomers determines the characteristics of the polymer. Conventional products are generally made from petroleum based polymers which may have an adverse impact on the environment.

Polypropiolactone ("PPL") is a generally biodegradable polyester polymer formed from beta lactone monomers and is useful as a material in many commercial and industrial applications. For example, low molecular weight PPL may be intentionally thermally decomposed to produce acrylic acid, a commodity chemical with many uses. In another example, high molecular weight PPL polymer is ideal for use in packaging and thermoplastic applications because of the polymer's mechanical and chemical properties. Advantageously, high molecular weight PPL may be used as an alternative to conventional petroleum based polymers, such as polyethylene (PE), polypropylene (PP), and polyethylene terephthalate (PET) because of PPL's advantageous barrier properties, biodegradability, and reduced environmental impact.

Polyester polymers suffer from increased degradation at higher temperatures. PPL may decompose at temperatures generally lower than those of conventional polyesters. The relatively low degradation temperature of PPL may be explained in terms of an ester-pyrolysis mechanism in which a cyclic transition state is involved, as depicted in Equation 1, below. This leads to two polymeric fragments, one of them (III) containing an unsaturated chain end and the other one (II) a carboxylic chain end:

Equation 1

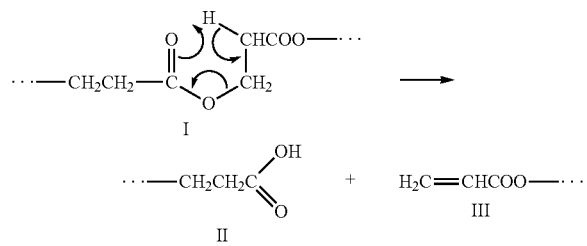

A polymeric fragment with the carboxylic chain end and acrylic acid (IV) may also be formed in a subsequent step (Equation 2):

Equation 2

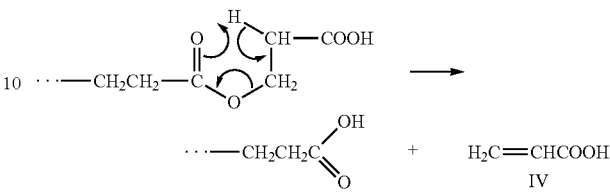

Thus, there exists a need for more thermally stable high molecular weight PPL.

BRIEF SUMMARY

The present invention satisfies this need by providing for end-capped PPL polymers and processes for production of end-capped PPL polymers. In some aspects, provided herein are more thermally stable PPL polymers and methods for producing the same.

In certain aspects, provided are also methods and processes for end-capping PPL with an end-capping agent to produce an end-capped PPL polymer.

In preferred embodiments, the terminal carboxylic acid functional groups of the majority of PPL polymer chains are replaced with non-carboxylic acid end groups derived from the end-capping agents. In certain preferred embodiments, the end-capping agents react with the carboxylate functional groups of the PPL to produce an end-capped PPL polymer. Advantageously, the end-capped PPL polymers are more resistant to thermal degradation.

DESCRIPTION OF THE FIGURES

The present application can be best understood by reference to the following description taken in conjunction with the accompanying figures, in which like parts may be referred to by like numerals.

DETAILED DESCRIPTION

Figure 1:
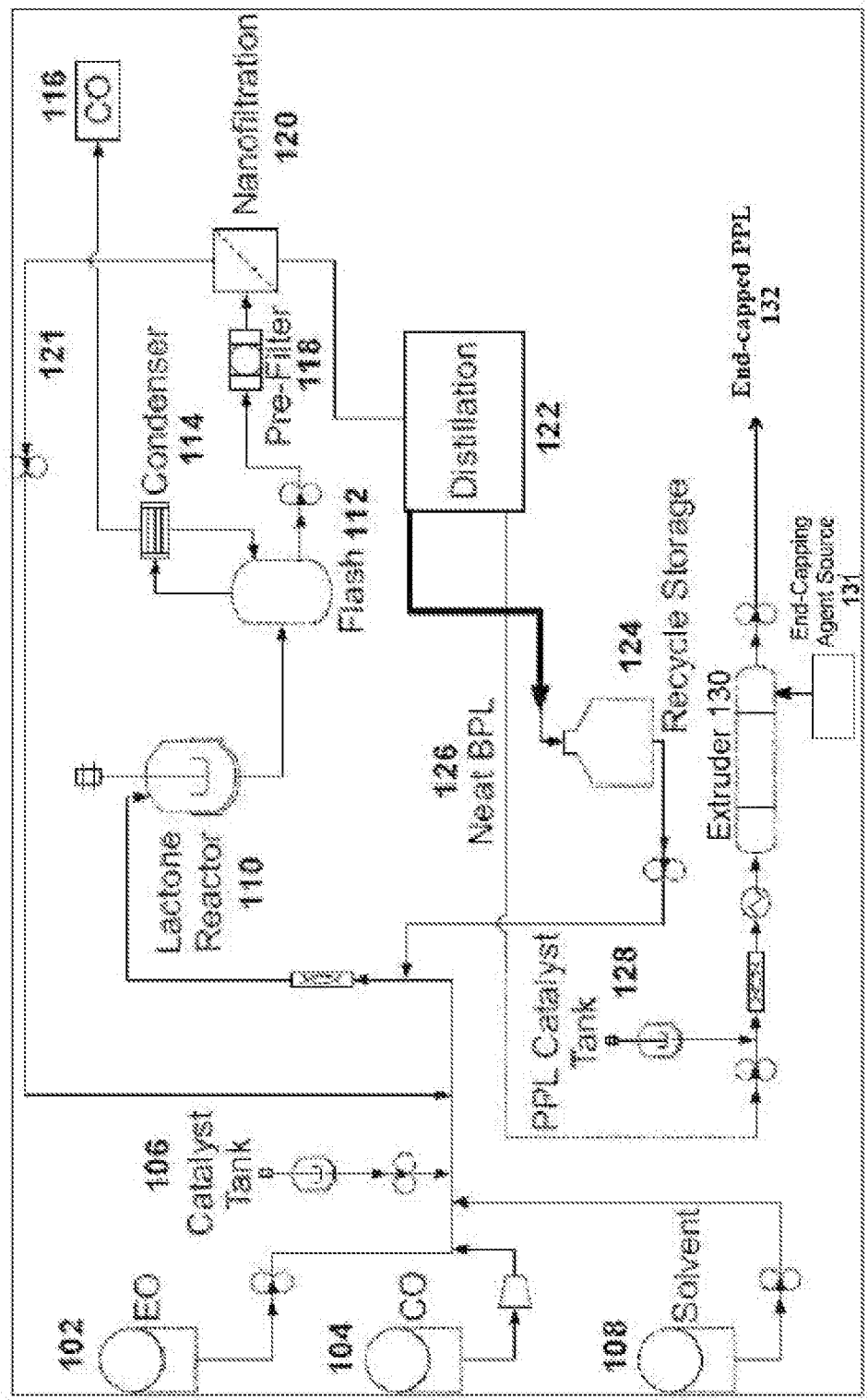
FIG. 1 depicts an exemplary system for production of end-capped PPL.

The following description sets forth exemplary systems, processes, parameters and the like. It should be recognized, however, that such description is not intended as a limitation on the scope of the present disclosure but is instead provided as a description of exemplary embodiments.

All numeric values are herein assumed to be modified by the term "about", whether or not explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

As used herein, an element or step recited in the singular and preceded with the word "a" or "an" should be understood as not excluding plural said elements or steps, unless such exclusion is explicitly stated. As used in this specification and the appended claims, the term "or" is generally employed in its sense including "and/or" unless the content clearly dictates otherwise.

Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

This invention provides methods and systems for improving the thermal stability of polylactones such as PPL. The extent to which polylactone degradation occurs depends in part on the structure of the end groups of the polymer. Polymer degradation can significantly reduce the molecular mass of the polymer, thereby changing its properties.

The figure below generally represents the reaction between polypropiolactone (PPL) and an aniline derivative end-capping agent to form end-capped PPL. The terminal carboxylic functional group of the PPL is reacted with the end-capping agent to produce a thermally stable PPL polymer.

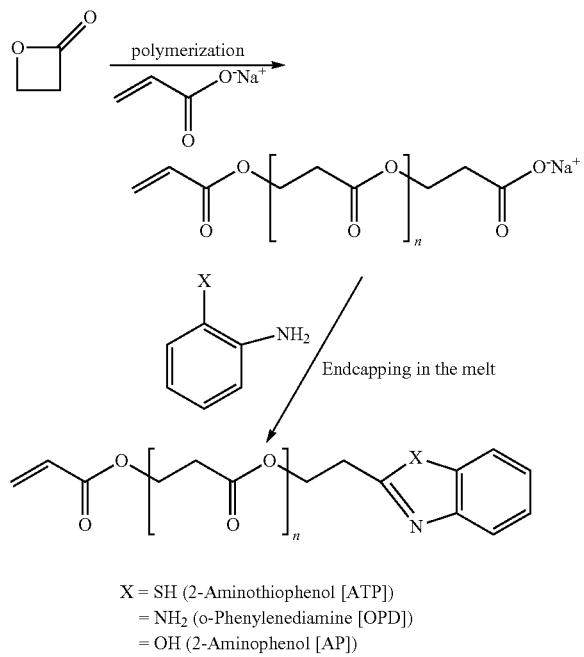

X = SH (2-Aminothiophenol [ATP])
= NH₂ (o-Phenylenediamine [OPD])
= OH (2-Aminophenol [AP])

I. Methods

In one aspect, provided are integrated processes and methods for the production of end-capped polylactones such as end-capped PPL. In certain embodiments, provided are integrated processes and methods for the production of end-capped PPL from ethylene oxide. In certain embodiments, provided are integrated processes for the conversion of ethylene oxide to end-capped PPL via carbonylation, wherein carbonylation solvent is removed following the carbonylation step and prior to PPL polymerization.

In some embodiments, provided is a method for the synthesis of end-capped PPL comprising:
polymerizing beta lactones to create PPL with a terminal carboxylic or carboxylate functional group; and
reacting the terminal carboxylic or carboxylate functional group of the PPL with an end-capping agent to produce thermally stable end-capped PPL.

Polymerization of beta lactones to PPL can be performed with a number of polymerization initiators including, for example, amines and polyamines. In some embodiments the initiator may be a nucleophile. In some embodiments the initiator may be sodium stearate, calcium stearate, and magnesium stearate. Other initiators may include sodium acrylate, sodium acetate, potassium salts of carboxylic acids in conjunction with 18-crown-6, and salts with tetramethylammonium, tetraphenylphosphonium, or 1-butyl-3-methylimidazolium cations.

Polymerization of beta lactones to PPL may further proceed in the presence of a suitable polymerization catalyst. A variety of catalysts may be used in the polymerization reaction, including, for example, metals (e.g., lithium, sodium, potassium, magnesium, calcium, zinc, aluminum, titanium, cobalt, etc.) metal oxides, carbonates of alkali- and alkaline earth metals, and borates and silicates of various metals. In some variations, catalysts that may be used in the polymerization reaction, include, for example, metals (e.g., lithium, sodium, potassium, magnesium, calcium, zinc, aluminum, titanium, cobalt, etc.) metal oxides, salts of alkali and alkaline earth metals (such as carbonates, borates, hydroxides, alkoxides, and carboxylates), and borates, silicates, or salts of other metals.

In some embodiments of provided methods, the molecular weight of the PPL may be greater than about 100,000, with improved results above about 250,000. In some embodiments, the molecular weight of the PPL is between about 100,000 and about 1,000,000, and more preferably between about 200,000 and about 400,000. In some embodiments, the molecular weight of the PPL is greater than about 350,000.

In one variation, the method further comprises pretreating the PPL by dissolving the PPL. In some embodiments, the PPL may be dissolved in chloroform. In some embodiments, the PPL may be dissolved at between about 20° C. and about 150° C. In some embodiments the PPL may be dissolved at about 40° C. Alternatively, the PPL may be heated to create a PPL melt.

PPL is reacted with one or more end-capping agents to produce thermally stable end-capped PPL. Suitable end-capping agents include thermally stable aniline derivatives that react with the carboxylate functional groups of the PPL. Generally, this involves a non-aqueous system. These end-capping agents decrease the extent of polymer degradation in the PPL chain.

Thermally stable aniline derivatives may include azoles such as those selected from the group consisting of benzothiazole, benzoxazole, benzimidazole, 2-aminothiophenol, o-phenylenediamine, and 2-aminophenol.

Suitable end-capping agents may further include phosphates such as those selected from the group consisting of trimethylphosphate and triphenylphosphate. Suitable end-capping agents may even further include other additives and stabilizers such as isophthalic acid.

In some embodiments, the end-capping agent may be added to the PPL at between about a 1.0 and about 2.0 mole ratio. In some embodiments, the mole ratio of end-capping agent may be about 1.5. The excess end-capping agent ensures adequate end-group access.

In some embodiments of provided methods, the PPL is reacted with the end-capping agent at a temperature of between about 0° C. and about 200° C. In preferred embodiments, the PPL is reacted with the end-capping agent at a temperature of between about 20 and about 100° C. In some embodiments, the PPL is reacted with the end-capping agent at about the temperature of PPL polymerization. For example, in some embodiments, the PPL is reacted with the end-capping agent at about 60° C. Preferably, the end-capping agent is reacted with the PPL at a temperature below the decomposition temperature of the PPL. For example, the end-capping agent may be reacted with the PPL at about 25° C.

In some embodiments of the provided methods, the PPL is reacted with the end-capping agent for between about 5 and about 30 minutes. In some embodiments, the PPL is reacted with the end-capping agent for between about 10 and about 25 minutes. In some embodiments, the PPL is reacted with the end-capping agent for about 15 minutes.

In some embodiments of the provided methods, the PPL may be reacted with the end-capping agent in a reactor. In some embodiments, the reactor may be an extruder, and the PPL may be reacted with the end-capping agent during extrusion. In some embodiments, the reactor may be a plug-flow reactor (PFR) such as a static mixer, or a continuous stirred tank reactor (CSTR), or a batch mixer.

In certain embodiments, the processes of the present invention include production of PPL from ethylene oxide as described in U.S. application Ser. No. 15/550,234 filed on Feb. 12, 2016 and herein incorporated in its entirety by reference.

In some embodiments, provided is a method for the synthesis of end-capped PPL comprising:

(a) providing feedstock streams of ethylene oxide (EO) and carbon monoxide, which feedstock streams are optionally combined;

(b) directing the feedstock streams to a first reaction zone where they are contacted with a carbonylation catalyst in the presence of a carbonylation solvent and where at least a portion of the EO is converted to a beta propiolactone (BPL) product stream comprising BPL;

(c) separating carbonylation catalyst from the beta lactone product stream to provide a carbonylation catalyst recycling stream;

(d) directing the beta propiolactone product stream comprising BPL and carbonylation solvent to a carbonylation solvent removal zone where carbonylation solvent is removed from the beta propiolactone product stream;

(e) optionally introducing a second solvent into the beta propiolactone product stream after step (d) and directing the beta propiolactone product stream to a second reaction zone where BPL is contacted with a polymerization catalyst and where at least a portion of the BPL is converted to a PPL product stream comprising PPL; and (f) directing the PPL product stream to a third reaction zone wherein the PPL product stream is contacted with an end-capping agent and where at least a portion of the PPL is converted to end-capped PPL.

In some variations, provided is a method for the synthesis of end-capped polypropiolactone (PPL) comprising:

providing feedstock streams of ethylene oxide (EO) and carbon monoxide, wherein the feedstock streams are optionally combined;

directing the feedstock streams to a first reaction zone;

contacting the feedstock streams with a carbonylation catalyst in the presence of a carbonylation solvent in the first reaction zone to convert at least a portion of the EO to a beta propiolactone (BPL) product stream, wherein the BPL product stream comprises BPL, carbonylation catalyst, and carbonylation solvent;

separating at least a portion of carbonylation catalyst from the BPL product stream to produce a carbonylation catalyst recycling stream and a processed BPL product stream, wherein the processed BPL product stream comprises BPL and carbonylation solvent;

directing the processed BPL product stream to a carbonylation solvent removal zone;

removing at least a portion of the carbonylation solvent from the processed BPL product stream to produce a polymerization feed stream, wherein the polymerization feed stream comprises BPL;

directing the polymerization feed stream to a second reaction zone;

contacting BPL in the polymerization feed stream with a polymerization catalyst in the second reaction zone to convert at least a portion of the BPL to a PPL product stream;

directing the PPL product stream to a third reaction zone; and contacting the PPL product stream with an end-capping agent in the third reaction zone to convert at least a portion of the PPL to end-capped PPL.

In some variations of the method described above, the method further comprises introducing a second solvent into the polymerization feed stream, prior to contacting the polymerization feed stream with the polymerization catalyst.

In some variations of the method described above, the BPL product stream may be formed by reacting formaldehyde with a ketene. In one variation, formaldehyde is reacted with ethenone to produce beta-propiolactone, as shown in the exemplary reaction scheme below.

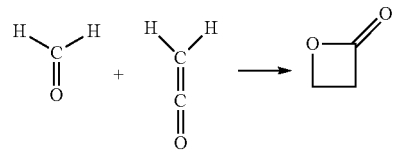

In some variations of the method described above, the method may include a distillation step whereby the BPL is separated from unreacted EO, carbonylation solvent, carbonylation catalyst residue, and side products such as polyethylene oxide, acetaldehyde, and succinic anhydride.

In some embodiments of the provided methods, the third reaction zone comprises a reactor. In some embodiments, the reactor may be an extruder, and the PPL product stream may be reacted with the end-capping agent during extrusion. In other embodiments, the reactor may be a plug-flow reactor (PFR) such as a static mixer, or a continuous stirred tank reactor (CSTR), or a batch mixer.

II. Systems

In another aspect, provided are systems for the synthesis of end-capped PPL. In certain embodiments, the present invention includes a system for the production of PPL from ethylene oxide as described in U.S. application Ser. No. 15/550,234 filed on Feb. 12, 2016 and herein incorporated in its entirety by reference.

In some embodiments, a system for the conversion of ethylene oxide to end-capped polypropiolactone (PPL) comprises:

(a) ethylene oxide and carbon monoxide;

(b) a first reaction zone where ethylene oxide and carbon monoxide are contacted with a carbonylation catalyst in the presence of a carbonylation solvent, where at least a portion of the EO is converted to a beta propiolactone product stream;

(c) a solvent removal unit for removing carbonylation solvent from the beta propiolactone product stream;

(d) optionally a second solvent different from the carbonylation solvent, introduced into the beta propiolactone product stream after solvent removal;

(e) a second reaction zone where the beta propiolactone product stream is contacted with a suitable polymerization catalyst, where at least a portion of the beta propiolactone forms a PPL product stream; and a third reaction zone where the PPL product stream is contacted with an end-capping agent, where at least a portion of the PPL forms end-capped PPL.

In some variations, provided is a system for converting ethylene oxide to PPL, comprising:

an ethylene oxide source;
a carbon monoxide source;
a carbonylation catalyst source;
a carbonylation solvent source;
a polymerization catalyst source;
a first reaction zone configured to receive ethylene oxide from the ethylene oxide source, carbon monoxide from the carbon monoxide source, carbonylation catalyst from the carbonylation catalyst source, and carbonylation solvent from the carbonylation solvent source, and to output a beta propiolactone (BPL) product stream from contacting the ethylene oxide and the carbon monoxide with the carbonylation catalyst in the presence of the carbonylation solvent in the first reaction zone, wherein the BPL product stream comprises carbonylation solvent and BPL;

a solvent removal unit configured to remove at least a portion of the carbonylation solvent from the BPL product stream;

a second reaction zone configured to receive the BPL product stream from the solvent removal unit, and polymerization catalyst from the polymerization catalyst source, and to output a PPL product stream from contacting the BPL product stream with the polymerization catalyst in the second reaction zone, wherein the PPL product stream comprises PPL;

an end-capping agent source; and a third reaction zone configured to receive the PPL product stream from the second reaction zone, and an end-capping agent from the end-capping agent source, and to output an end-capped PPL product stream from contacting the PPL product stream with the end-capping agent in the third reaction zone, wherein the end-capped PPL product stream comprises end-capped PPL.

In one variation, the system further comprises a second solvent source, wherein the second solvent source is configured to output a second solvent for combining with the BPL product stream, wherein the second solvent is different from the carbonylation solvent.

In some variations of the system described above, the BPL product stream may be formed by reacting formaldehyde with a ketene. In one variation, formaldehyde is reacted with ethenone to produce beta-propiolactone, as shown in the exemplary reaction scheme below.

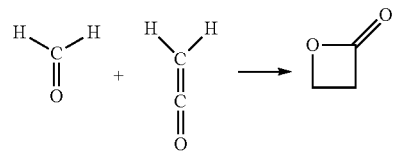

In some embodiments, the third reaction zone comprises a reactor. In some embodiments, the reactor is an extruder, and the PPL product stream is reacted with the end-capping agent during extrusion. In some embodiments, the reactor may be a plug-flow reactor (PFR) such as a static mixer, or a continuous stirred tank reactor (CSTR), or a batch mixer.

It should generally be understood that reference to "a first reaction zone", "a second reaction zone", or "a third reaction zone", etc., or "a first solvent" and "a second solvent", etc., or "a first solvent source" and "a second solvent source", etc., does not necessarily imply an order of the reaction zones, solvents or solvent sources. In some variations, the use of such references denotes the number of reaction zones, solvents or solvent sources present. In other variations, an order may be implied by the context in which the reaction zones, solvents or solvent sources are configured or used.

For example, FIG. 1 depicts an exemplary system 100 for the production of end-capped PPL 132. With reference to FIG. 1, ethylene oxide (EO) from EO source 102, carbon monoxide (CO) from CO source 104, carbonylation catalyst from catalyst tank 106, and a carbonylation solvent from solvent source 108 are fed to lactone reactor 110 to produce BPL. Excess carbon monoxide 116 in the product stream exiting lactone reactor 110 may be removed via flash tank 112 and condenser 114, while the BPL product stream enters nanofiltration system 120 for removal of carbonylation catalyst. In some variations of the system, the BPL product stream may pass through pre-filter 118 prior to entry into nanofiltration unit 120. Carbonylation catalyst recycling loop 121 may feed recovered carbonylation catalyst back to lactone reactor 110. The filtered BPL product stream exiting nanofiltration unit 120 then enters distillation unit 122, wherein carbonylation solvent is removed from the BPL, and the withdrawn solvent stream may be stored in recycle storage 124 and/or returned to lactone reactor 110. PPL catalyst from PPL catalyst tank 128 is combined with neat BPL stream 126 and they collectively enter extruder reactor 130, optionally along with a second solvent (not depicted in FIG. 1). PPL synthesis occurs in extruder reactor 130. End-capping agent from end-capping agent source 131 is combined with the PPL in the extruder reactor 130 to produce end-capped PPL 132.

It should generally be understood that one or more units may be omitted or added to exemplary system 100 depicted in FIG. 1. For example, in some variations, catalyst tank 106 may be omitted in favor of using a heterogeneous carbonylation catalyst in a fixed bed arrangement in lactone reactor 110. In other variations, pre-filter 118 may be omitted, and the BPL product stream may pass through directly into nanofiltration unit 120. In other variations, carbonylation catalyst recycling loop 112 may be further purified in an additional purification unit (including, for example, an additional distillation unit) prior to return to lactone reactor 110.

It should generally be understood that any of the variations and embodiments described herein for the methods may also apply to the systems described herein.

It is to be further understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

EXAMPLES

The following examples are merely illustrative and are not meant to limit any aspects of the present disclosure in any way.

Example 1

A high molecular weight (e.g., MW>450,000) PPL was dissolved in solvent (e.g., chloroform) at 40° C. A 3 weight percent solution was prepared in two separate jars by dissolving 3.76 g PPL in 121.59 g $CHCl_3$ and 4.57 g PPL in 147.76 g $CHCl_3$, respectively. In three separate vials, 40 g of the PPL solution (i.e. 1.2 g neat polymer basis) was taken and 1.5 mole ratio end-capping agents was dissolved in the PPL solution at room temperature. The solvent was subsequently removed by evaporation under vacuum before being heated to 80° C. The 50 percent excess end-capping agent was chosen to ensure adequate end-group access.

Example 2

0.00075 mg of 2-aminothiophenol was added to 1.2 g of 450,000 MW PPL and heated to 80° C. for 45 minutes—as described in Example 1. The diffusion NMR results showed that non-capped PPL had a molecular weight of 220,000 after heating while the 2-aminothiophenol end-capped PPL had a molecular weight of 450,000.

Example 3

0.0005 mg of o-phenylenediamine was added to 1.2 g of 450,000 MW PPL and heated to 80° C. for 45 minutes—as described in Example 1. The diffusion NMR results showed that non-capped PPL had a molecular weight of 220,000 after heating while the o-phenylenediamine end-capped PPL had a molecular weight of 450,000.

Tables 1 and 2 display stability tests for the ATP- and OPD-capped polymers at 72° C. and 120° C., respectively.

TABLE 1

| Hydrolytic Stability tests in water at 72° C. | |
|---|---|
| Polymer | MW after stirring in hot water for 1 hour at 72° C. |
| Control PPL | 180,000 |
| ATP-PPL | 364,000 |
| OPD-PPL | 382,000 |

TABLE 2

| Polymer | MW after heating for 1 hour at 120° C. |
| --- | --- |
| ATP-PPL | 362,000 |
| OPD-PPL | 323,000 |

Molecular weights of the polymers after heating for 1 hour at 120° C.

These results show a much higher molecular weight of the end-capped polymer versus uncapped polymer after heat testing. The data show that the aniline-capped PPL does not degrade as easily as the non-capped PPL.

Figure 2:
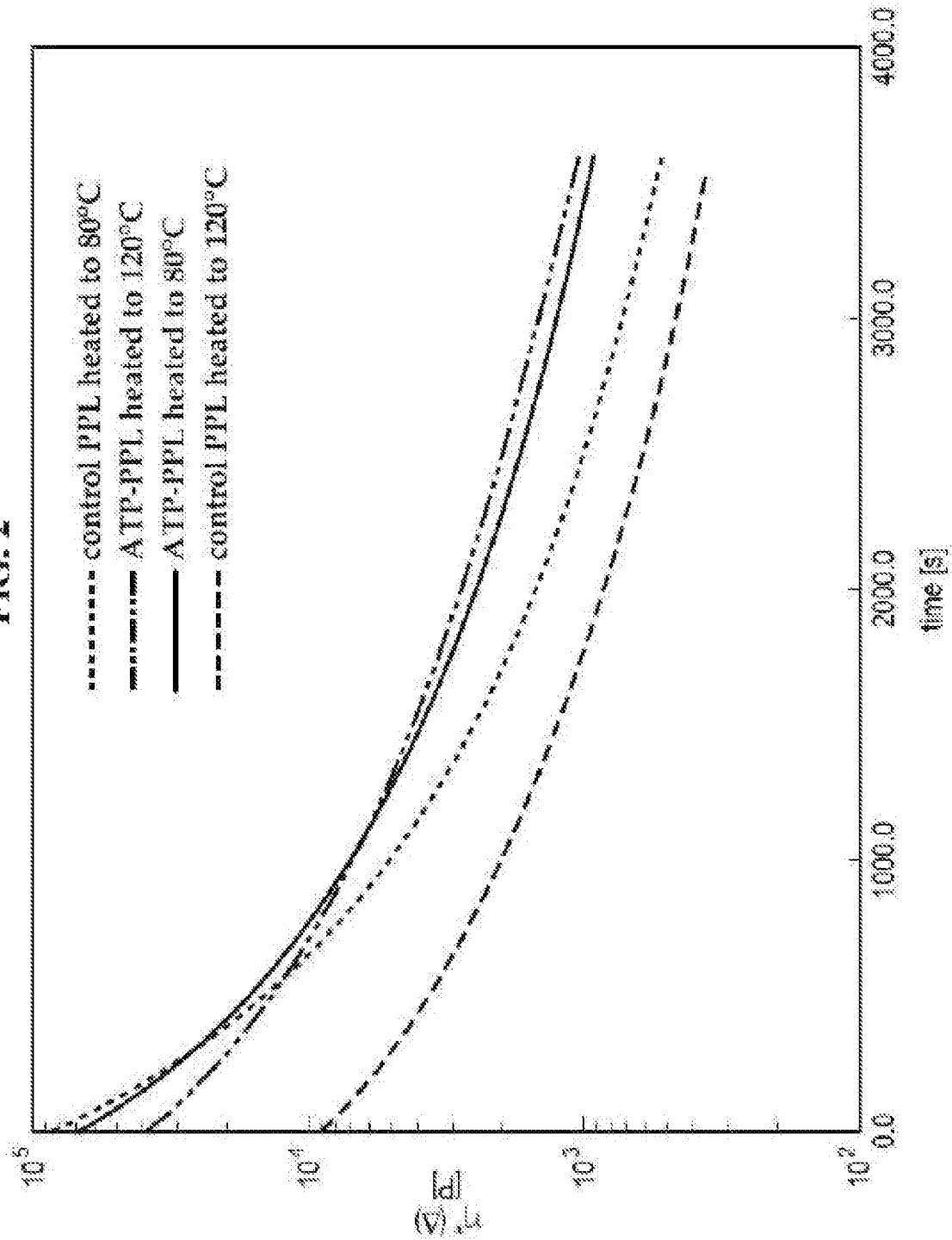
FIG. 2 is a graph of isothermal viscosity curves for end-capped and non-end-capped PPL obtained at 80° C. and 120° C. for 60 minutes, in accordance with features of the present invention.

FIG. 2 is a graph of the dynamic viscosity values of ATP-end-capped PPL over a temperature range from about 80° C. to about 120° C. FIG. 2 demonstrates that ATP-end-capped PPL degrades to a lesser extent than non-end-capped PPL at high temperatures. Specifically, FIG. 2 shows that ATP-end-capped PPL maintains higher viscosities than non-end-capped PPL after being heated to about 80° C. and about 120° C.

The above description covers end-capping of a sodium-free high molecular weight PPL. More experiments were done using PPL made with a sodium stearate initiator and end-capped with aminothiophenol. The experiment was performed in the same manner as described above with a 180,000-190,000 MW PPL made using a sodium stearate initiator. A summary of the results is shown in Table 3 below.

TABLE 3

Aminothiophenol end-capped PPL at 40° C., 80° C. and 120° C. heat treatment

| Sample ID | Initial state (from CHCl$_3$ at 25° C.) | T = 40° C. (overnight stirring in bath) | T = 80° C. (heated for 45 mins at temp) | T = 120° C. (heated for 30 minutes at temp) |
| --- | --- | --- | --- | --- |
| Control PPL | 180,000 | 166,000 | 137,000 | 69,000 |
| ATP-PPL | 180,000 | 171,000 | 133,000 | 102,000 |

Table 3 illustrates the difference in molecular weight between ATP-end-capped PPL and non-end-capped PPL after being heated. The initial molecular weights of PPL were between about 180,000 and 190,000. It was observed that ATP-end-capped PPL had a higher molecular weight than control PPL after being heated to 40° C. overnight and after being heated to 120° C. for 30 minutes. These results demonstrate that at high temperatures (T=120° C.), ATP-end-capped PPL degrades to a much lesser extent than non-end-capped PPL. The ordinate units of the graph is poise (P) and the abscissa is in seconds.

Example 4

20 mL of a roughly 10 wt % chloroform solution of PPL was treated with five drops of neat trimethylphosphate. The mixture was stirred overnight. The PPL was then precipitated in 50 mL of isopropanol. The reaction between the PPL and the trimethylphosphate is illustrated in the figure below.

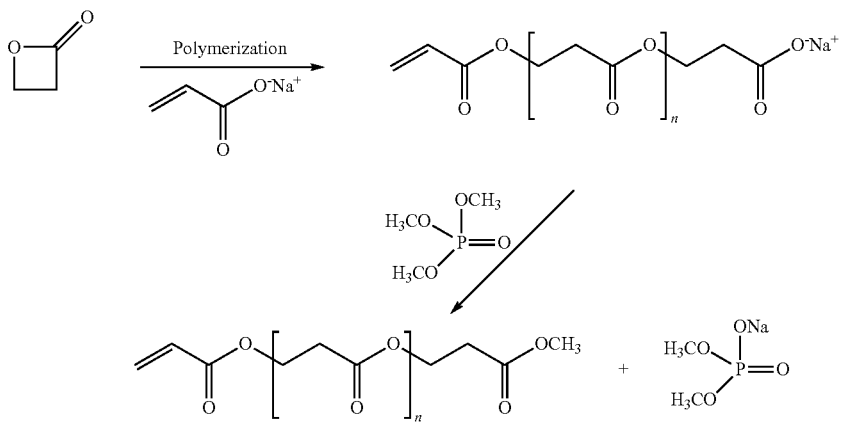

Figure 3:
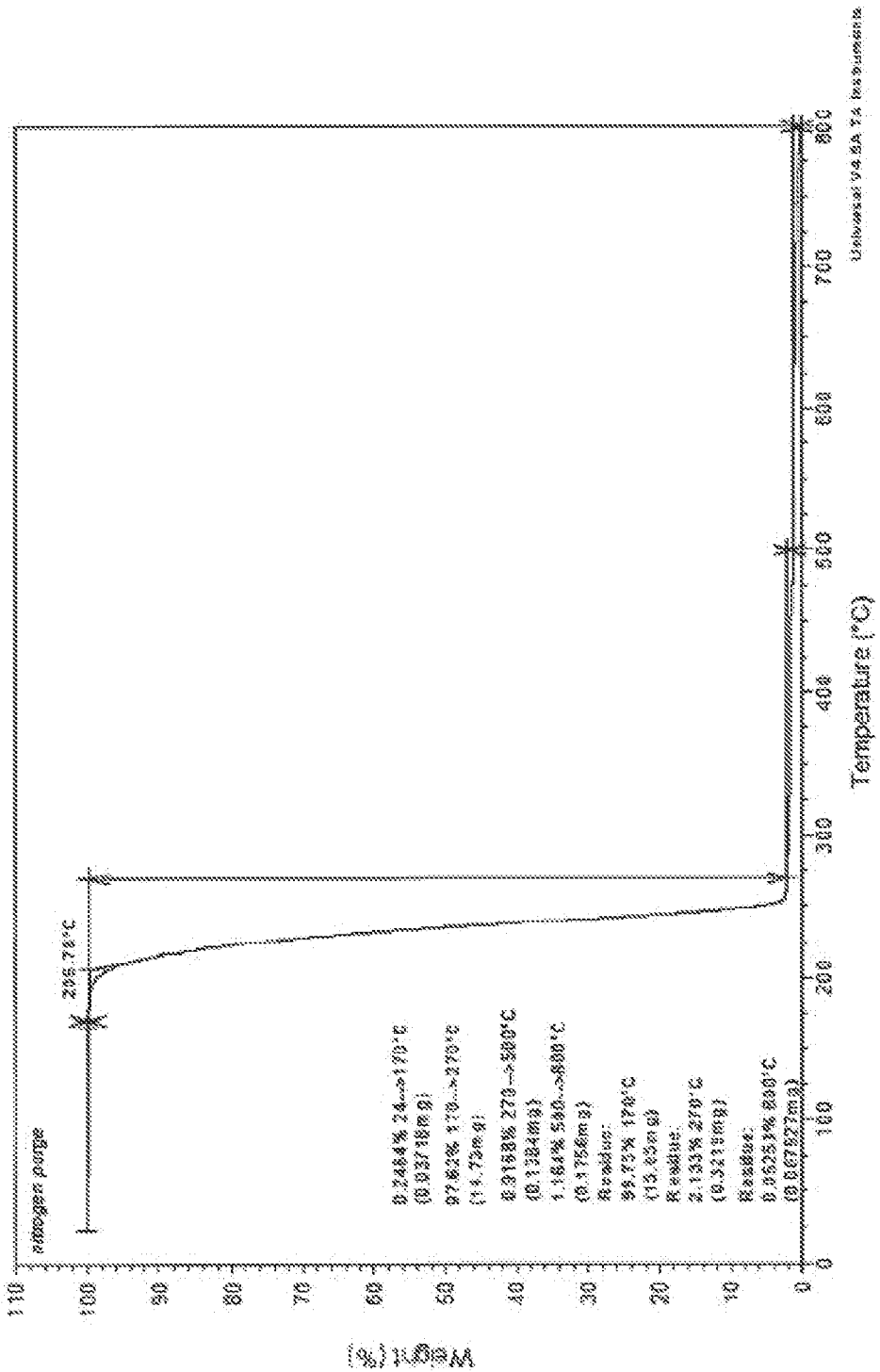
FIG. 3 is a thermogravimetric analysis graph depicting the temperature at which non-end-capped PPL begins to degrade.
Figure 4:
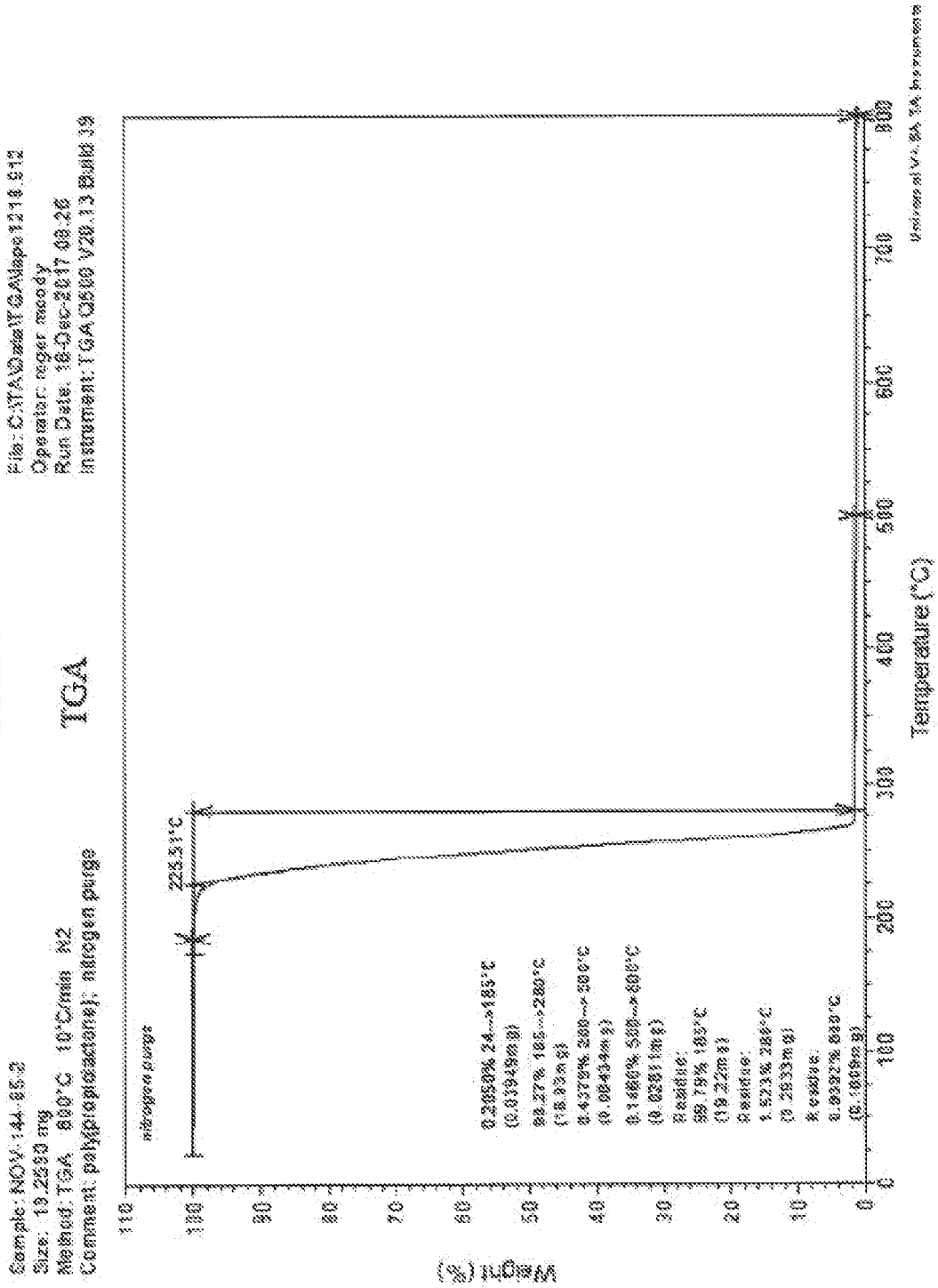
FIG. 4 is a thermogravimetric analysis graph depicting the temperature at which trimethylphosphate-end-capped PPL begins to degrade.

FIG. 3 is a TGA graph showing the onset of degradation temperature for the non-end-capped PPL (205.78° C.). FIG. 4 is a TGA graph showing the onset of degradation temperature for the trimethylphosphate-end-capped PPL (225.51° C.). The temperature of degradation onset was 20° C. higher for trimethylphosphate-end-capped PPL than the non-end-capped PPL. These results demonstrate the increased thermostability of end-capped PPL.

What is claimed is:
1. A polymer, comprising:
a. a backbone having one or more beta lactones;
b. a first end being an initiator; and
c. a second end being a non-carboxylic acid end group derived from aniline derivative comprising one or more of benzothiazole, benzoxazole, benzimidazole, 2-aminothiophenol, o-phenylenediamine, or 2-aminophenol, or any combinations thereof.
2. The polymer of claim 1, wherein the initiator comprises a residue of one or more of sodium stearate, calcium stearate, magnesium stearate, sodium acrylate, sodium acetate, potassium salts of carboxylic acids in conjunction with 18-crown-6, salts of tetramethylammonium, salts of tetraphenylphosphonium, or salts of 1-butyl-3-methylimidazolium cations, or a combination thereof.
3. The polymer according to claim 1 wherein the polymer having the non-carboxylic acid end group of the aniline derivative corresponds to the formula;

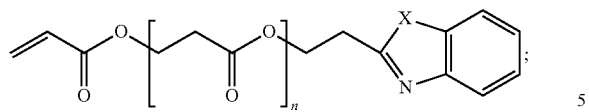
wherein X is S, O or NH.
* * * * *